L. C. Chase,

Fastening Sleigh Bells,

N°32,274.  Patented May 14, 1861.

Witnesses
H. F. Chase
C. E. Pearson

Inventor
L. C. Chase

UNITED STATES PATENT OFFICE.

L. C. CHASE, OF BOSTON, MASSACHUSETTS.

MODE OF STRINGING SLEIGH-BELLS.

Specification of Letters Patent No. 32,274, dated May 14, 1861.

*To all whom it may concern:*

Be it known that I, LUCIUS C. CHASE, of Boston, in the county of Suffolk and Commonwealth of Massachusetts, have invented a new and useful Improvement in Stringing Sleigh-Bells; and I do hereby declare that the following is a full, clear, and exact description of the construction and operation of the same, reference being had to the accompanying drawings, forming a part of this specification, in which—

Figure 1:
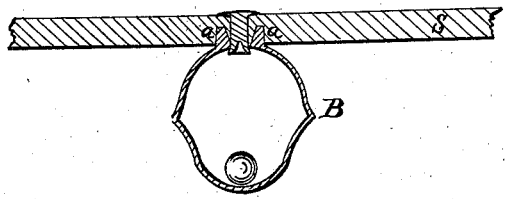
Figure 2:
Figure 3:
Figure 4:
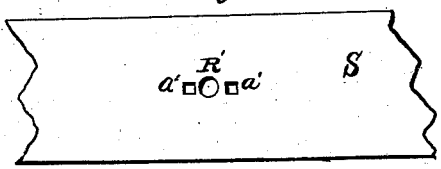

Figure 1 is a section through the strap, rivet, shanks and bell; Fig. 2, a perspective view of the rivet; Fig. 3, a longitudinal section of the same; and Fig. 4, a top view of a portion of the strap, showing the punched holes for the reception of the rivet and shanks.

Like parts are indicated by the same letters in all the drawings.

The nature of my invention consists, 1st, in constructing a sleigh-bell with two shanks (*a a*), and a hole between them to receive a rivet (R) which—passing through the strap, between said shanks, and through said hole—is headed down, upset, or enlarged, inside of the bell; whereby the bell is more firmly secured to the strap and less liable to become loose so as to chafe the leather, and muffle the vibrations of the metal, than by any other method of "stringing"; while, at the same time, the labor is performed with much greater rapidity and less expense; and 2d, in making the rivet with a countersink, or hole, (*r*) in the end, to facilitate the operation of riveting by guiding the conical punch (which is used for that purpose), and to cause the rivet, by the action of the punch, to be expanded in the hole in the bell, whereby the tone of the latter is greatly improved—the rivet having so tight a fit in the hole, and so small a bearing, as not to impede, or deaden, the vibrations of the bell. This method of constructing the rivet also allows it to be so small as to be easily inserted in the hole between the shanks, and, at the same time, insure a close and perfect contact, by expanding that part of the rivet which enters the bell.

B is the bell which is constructed with two shanks, *a, a*, as shown in Fig. 1, about one fourth of an inch apart, and projecting about one eighth of an inch above the surface. Through the bottom of the bell, between said shanks, is drilled a round hole, about one eighth of an inch in diameter, to receive the rivet R. The size and shape of the rivet are shown in Figs. 2 and 3;—the countersink, or hole, *r*, being made simultaneously with the head, by a suitable punch, in a common rivet machine. The hole, *r*, is about one eighth of an inch deep, and may be either conical, or parallel with the outside of the rivet.

A hole R′ (Fig. 4) of the diameter of the rivet is punched in the strap S, and at the same time two other holes, *a′, a′*, for the reception of the shanks, *a, a*, Fig. 1. The rivet is next inserted so as to bring the head against the back of the strap. The bell is then placed in the right position on the front of the strap, so that the end of the rivet shall enter the hole between the shanks and project a short distance above the inner surface. The back of the strap is now laid on a flat and solid piece of iron. A steel punch with a conical point is then passed through the slot until said point enters the countersink, *r*, by which it is guided and held in the proper position;—when one blow of a hammer on the punch drives the shanks into the leather so as to prevent the bell from turning, and not only upsets, or heads down, the end of the rivet but also expands the same in the hole in the bell so as to produce and insure a perfect fit. And by means of this perfect fit of the rivet in the bell metal, the latter vibrates more freely and produces a louder, clearer and more agreeable tone, than can be produced by the same bells when attached to the strap by any other method with which I am acquainted. The back of the strap (the rivet heads being driven in flush as in Fig. 1) is so smooth as to require no lining; and hence a one-ply strap, without any sewing, is all that is required.

What I claim as my invention and desire to secure by Letters Patent is—

Constructing a sleigh-bell with two shanks, *a, a*, and a hole between them, and confining it to the strap by means of a single rivet passing through the strap, between said shanks, and headed down inside of the bell, substantially as described and for the objects specified.

L. C. CHASE.

Witnesses:
H. F. CHASE,
C. E. PEARSON.